US010495381B2

(12) United States Patent
Varner et al.

(10) Patent No.: US 10,495,381 B2
(45) Date of Patent: Dec. 3, 2019

(54) AGGREGATE DRYER WITH EXHAUST QUENCHING SYSTEM

(71) Applicant: Astec Industries, Inc., Chattanooga, TN (US)

(72) Inventors: Michael Christopher Varner, East Ridge, TN (US); Ted Jonas Hope, III, Rock Spring, GA (US)

(73) Assignee: Astec Industries, Inc., Chattanooga, TN (US)

( * ) Notice: Subject to any disclaimer, the term of this patent is extended or adjusted under 35 U.S.C. 154(b) by 312 days.

(21) Appl. No.: 15/447,392

(22) Filed: Mar. 2, 2017

(65) Prior Publication Data

US 2017/0254590 A1 Sep. 7, 2017

Related U.S. Application Data

(60) Provisional application No. 62/304,533, filed on Mar. 7, 2016.

(51) Int. Cl.
| | | |
|---|---|---|
| F26B 25/00 | (2006.01) | |
| F26B 23/02 | (2006.01) | |
| F26B 3/06 | (2006.01) | |
| F26B 11/02 | (2006.01) | |
| F26B 11/04 | (2006.01) | |

(Continued)

(52) U.S. Cl.
CPC ........ *F26B 25/005* (2013.01); *E01C 19/1036* (2013.01); *F23J 15/06* (2013.01); *F26B 3/06* (2013.01); *F26B 11/028* (2013.01); *F26B 11/04* (2013.01); *F26B 23/02* (2013.01); *F26B 25/007* (2013.01); *F26B 25/02* (2013.01); *E01C 2019/109* (2013.01); *F23J 2219/80* (2013.01)

(58) Field of Classification Search
None
See application file for complete search history.

(56) References Cited

U.S. PATENT DOCUMENTS

| | | |
|---|---|---|
| 3,692,286 A | 9/1972 | Borreill |
| 3,859,174 A | 1/1975 | Taylor |

(Continued)

FOREIGN PATENT DOCUMENTS

| | | |
|---|---|---|
| DE | 4143335 A1 | 5/1993 |
| EP | 1325773 A1 | 7/2003 |

(Continued)

OTHER PUBLICATIONS

Extended European Search Report of counterpart European Application No. 17763767.5 filed Feb. 12, 2018.

(Continued)

*Primary Examiner* — David J Laux
(74) *Attorney, Agent, or Firm* — Chambliss, Bahner & Stophel, P.C.

(57) ABSTRACT

An exhaust quenching system is provided for use in connection with an asphalt concrete production plant having a dryer for drying aggregate material, an exhaust gas outlet conduit for discharge of exhaust gases from the dryer, and a dust collection assembly that is adapted to receive exhaust gases and entrained dust from the dryer via the exhaust gas outlet conduit. The exhaust quenching system is adapted to effect evaporative cooling of the exhaust gases in the exhaust gas outlet conduit upstream of the dust collection assembly.

19 Claims, 1 Drawing Sheet

(51) Int. Cl.
*F26B 25/02* (2006.01)
*E01C 19/10* (2006.01)
*F23J 15/06* (2006.01)

(56) References Cited

U.S. PATENT DOCUMENTS

| | | | |
|---|---|---|---|
| 4,767,462 A | 8/1988 | Pons de Vinals | |
| 6,832,850 B1 | 12/2004 | Frank | |
| 7,481,060 B2 * | 1/2009 | Haertel | F02C 7/143 |
| | | | 60/39.3 |
| 9,612,009 B2 * | 4/2017 | Goodwin | F22G 5/123 |
| 2006/0064986 A1 * | 3/2006 | Ginter | F01K 21/047 |
| | | | 60/775 |
| 2008/0241029 A1 * | 10/2008 | Lissianski | F23D 1/00 |
| | | | 423/99 |
| 2010/0005683 A1 * | 1/2010 | Nielsen | B01D 1/16 |
| | | | 34/474 |
| 2015/0059660 A1 | 3/2015 | Cocuzza et al. | |

FOREIGN PATENT DOCUMENTS

| | | |
|---|---|---|
| GB | 1367076 | 9/1974 |
| JP | 2000249327 A | 9/2000 |

OTHER PUBLICATIONS

International Search Report and Written Opinion of counterpart PCT Application No. PCT/US2017/020330 dated May 19, 2017.

* cited by examiner

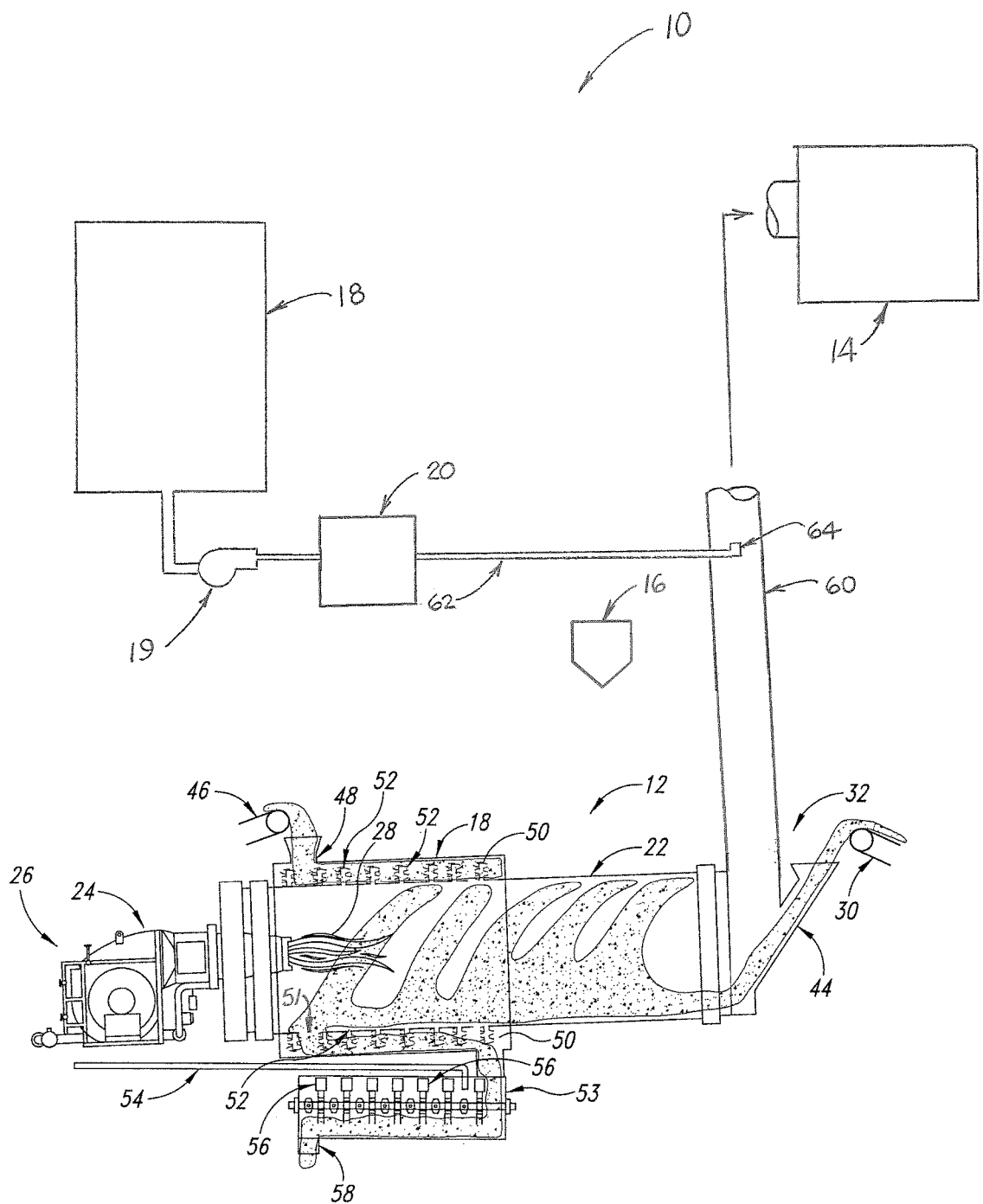

AGGREGATE DRYER WITH EXHAUST QUENCHING SYSTEM

CROSS-REFERENCE TO RELATED APPLICATION

This application claims the benefit of U.S. Provisional Patent Application No. 62/304,533 which was filed on Mar. 7, 2016.

FIELD OF THE INVENTION

The present invention relates generally to the production of asphalt concrete using aggregate materials. More particularly, the present invention relates to a method and apparatus for reducing the temperature of the exhaust gases from an aggregate dryer or an asphalt dryer/mixer in order to allow for the operation of the production facility using higher proportions of RAP and/or RAS than would otherwise be possible, and/or to protect a downstream filter-based dust collection assembly such as a baghouse.

BACKGROUND OF THE INVENTION

Production facilities for making asphalt concrete to be used as a paving composition are well-known. Feed materials for these facilities include aggregate materials and asphalt cement. The aggregate materials may be provided in the form of virgin aggregate materials, and/or RAP, and/or RAS. If RAP and/or RAS are included in the feed materials, these components will also provide an additional source of asphalt cement.

Some conventional asphalt concrete production plants employ a rotating dryer drum in which virgin aggregate materials and/or RAP and/or RAS are introduced. A burner is located at one end of the drum and the input feed materials are moved along the drum through the heated gases generated by the burner in either parallel flow or counter-current flow to an outlet. Such a dryer drum is sometimes referred to as a direct-fired dryer or a direct dryer, because the aggregate materials are moved into direct contact with the flames and combustion gases produced by the burner. A separate mixer, such as a rotating drum mixer or a pugmill, is employed to mix the heated and dried aggregate materials with liquid asphalt cement.

Another type of asphalt concrete production plant employs a dryer/mixer that dries and heats the aggregate material and also mixes it with asphalt cement. One such type of dryer/mixer is the DOUBLE BARREL® brand dryer/mixer that is sold by Astec, Inc. of Chattanooga, Tenn. This dryer/mixer includes a generally cylindrical fixed outer drum and a heating chamber comprised of a generally cylindrical inner drum that is adapted to rotate with respect to the outer drum. A burner at one end of the inner drum heats aggregate material by direct exposure to the flames and hot gases generated, and the heated aggregate material is discharged from the inner drum into the outer drum where it is mixed with asphalt cement and/or with RAP and/or RAS. If substantial quantities of RAP and/or RAS are introduced into the DOUBLE BARREL® brand dryer/mixer, a separate mixer such as a pugmill or mixing drum may be employed to incorporate additional asphalt cement into the mixture.

Other asphalt concrete production plants may employ indirect dryers and/or indirect pre-dryers which are adapted to heat and/or dry aggregate material without such material coming into direct contact with a burner flame or with the heated gases generated by a burner. Some such indirect dryers may include a rotating drum that is heated by a system comprising a plurality of thermal-fluid tubes that extend along the interior of the drum and are adapted to circulate a heated fluid along the inner walls of the drum as aggregate material to be heated is passed through the drum.

Whether a dryer/mixer or a dryer with a separate mixer is employed in the production of asphalt concrete, dust is generated as the aggregate materials that are included in the asphalt concrete mix are tumbled through the exhaust gases in the dryer/mixer or dryer. This dust is typically carried upwardly by the hot gases of combustion or other exhaust gases within the dryer/mixer or dryer. Because of particulate emission regulations, it is unacceptable to exhaust the dust-laden gases to the atmosphere. Furthermore, depending on the speed of rotation and the temperature at which the dryer/mixer or dryer is operated, the quantity of dust may represent a significant portion of the fine aggregate material needed in the particular asphalt concrete mix. Therefore, dust collection or recovery systems are known for removal of the dust from the gas stream before further processing of the exhaust gases and/or exhaustion of the same to the atmosphere. The dust which is collected in the dust recovery system may then be introduced to the dryer or mixing chamber for inclusion in the asphalt concrete mixture.

It is known to provide a dust recovery system which includes an inertially driven primary collector such as a cyclone and a filter-based secondary collector such as a baghouse. In such a system, the primary collector will operate to remove the larger sized particles (i.e. larger than about 150 microns) and the secondary collector will remove the remaining particles.

It is often economically advantageous to use a high proportion of RAP and/or RAS in the asphalt mixture. However, it is generally the case that the greater the proportion of RAP and/or RAS in the asphalt mixture, the lower the rate of heat transfer in the dryer or dryer/mixer and the higher the temperature of the dust-laden gas stream from the dryer or dryer/mixer. This dust-laden exhaust gas stream from the dryer/mixer or dryer may be as hot as 350° F. or higher. Exhaust gases at such temperatures may damage the filter media in a filter-based secondary collector such as a baghouse. Consequently, it would be advantageous to cool the exhaust gases in order to avoid damage to the filter media in the baghouse and/or to permit operation of the facility with a higher proportion of RAP and/or RAS.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest possible construction consistent with such definitions, as follows:

The terms "recycled asphalt product", "RAP" and similar terms refer to a comminuted or crushed product containing aggregate materials bound together by asphalt cement. RAP typically comprises crushed or comminuted recycled asphalt concrete.

The terms "recycled asphalt shingles", "RAS" and similar terms refer to crushed, shredded or comminuted asphalt roofing shingles and/or asphalt cement-containing products other than RAP.

The term "aggregate materials" and similar terms refer to crushed stone and other particulate materials that are used in the production of asphalt concrete, such as, for example, crushed limestone and other types of crushed stone, crushed Portland cement concrete, shredded or comminuted mineral and cellulosic fibers, RAP, RAS, gravel, sand, lime and other particulate additives. The term "virgin aggregate materials" refers to aggregate materials that do not include asphalt cement.

The term "asphalt cement" and similar terms refer to a bituminous material that is used in combination with aggregate materials in the production of asphalt concrete. Asphalt cement acts as the binder for various aggregate materials in the production of asphalt concrete.

The term "asphalt concrete" and similar terms refer to a bituminous paving mixture that is produced, using asphalt cement and/or RAP and/or RAS and any of various aggregate materials, in an asphalt dryer/mixer or other asphalt concrete production plant.

The term "direct dryer", "direct-fired dryer" and similar terms refer to a dryer or dryer/mixer device having a burner, which device is adapted to move input feed materials to be heated and/or dried along the device through the heated gases generated by the burner in either parallel flow or counter-current flow to an outlet.

The term "indirect dryer" and similar terms refer to a dryer or dryer/mixer device which is adapted to heat and/or dry input feed materials without such materials coming into direct contact with a burner flame or heated gases generated by a burner.

The term "dryer" includes direct dryers and dryer/mixers and indirect dryers and dryer/mixers.

The term "downstream", as used herein to describe a relative position on or in connection with an asphalt concrete production facility or a component thereof, refers to a relative position in the direction of the movement of material, air or gases through the facility or component thereof.

The term "upstream", as used herein to describe a relative position on or in connection with an asphalt concrete production facility or a component thereof, refers to a relative position in a direction that is opposite to the direction of the movement of material, air or gases through the facility or component thereof.

SUMMARY OF THE INVENTION

The invention comprises an exhaust quenching system for use in connection with an asphalt concrete production plant having a dryer, an exhaust gas outlet conduit for discharge of exhaust gases from the dryer, and a dust collection assembly that is adapted to receive exhaust gases and entrained dust from the dryer via the exhaust gas outlet conduit. The exhaust quenching system comprises means for effecting evaporative cooling of the exhaust gases in the exhaust gas outlet conduit upstream of the dust collection assembly. In a preferred embodiment of the invention, the exhaust quenching system includes a water reservoir, a water line that extends from the water reservoir into the exhaust gas outlet conduit, a pump for pumping water from the water reservoir through the water line into the exhaust gas outlet conduit, and a controller for controlling the operation of the exhaust quenching system.

The invention thus comprises an exhaust quenching system for reducing the temperature of the exhaust gases from an aggregate dryer or an asphalt dryer/mixer in order to allow for the operation of an asphalt concrete production facility using higher proportions of RAP and/or RAS than would otherwise be possible, and/or in order to protect a downstream filter-based dust collection assembly.

In order to facilitate an understanding of the invention, the preferred embodiments of the invention, as well as the best mode known by the inventors for carrying out the invention, are illustrated in the drawing, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter recited in the claims, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

ADVANTAGES OF THE PREFERRED EMBODIMENTS OF THE INVENTION

Among the advantages of the preferred embodiments of the invention is that the invention provides an exhaust quenching system for use in connection with an asphalt concrete production facility that provides a measure of protection for the filter media in a filter-based collector such as a baghouse. Another advantage of the preferred embodiments of the invention is that the invention provides a method and apparatus that allows for the production of asphalt concrete including a higher proportion of RAP and/or RAS than may be used conventional production facilities. Still another advantage of the preferred embodiments of the invention is that the invention may permit the successful operation of the aggregate dryer or dryer/mixer in an asphalt concrete production facility in a manner that produces higher temperature exhaust gases than may be allowed in a conventional facility.

Other advantages and features of this invention will become apparent from an examination of the drawing and the ensuing description.

BRIEF DESCRIPTION OF THE DRAWING

The presently preferred embodiments of the invention are illustrated in the accompanying drawing, wherein:

FIG. 1 is a schematic view of a preferred embodiment of a production facility or combination of components for the production of asphalt concrete according to the invention.

DESCRIPTION OF THE PREFERRED EMBODIMENTS OF THE INVENTION

This description of the preferred embodiments of the invention is intended to be read in connection with the accompanying drawing, which is to be considered part of the entire written description of this invention. The drawing is not necessarily to scale, and certain features of the invention may be shown exaggerated in scale or in somewhat schematic form in the interest of clarity and conciseness.

As shown in FIG. 1, asphalt concrete production facility 10 includes dryer/mixer 12, dust collection assembly (shown schematically at 14), and a preferred embodiment of an exhaust quenching system comprising controller 16, water reservoir 18, pump 19 and heat exchanger 20.

Dryer/mixer 12 is preferably a DOUBLE BARREL® brand Model XHR direct-fired dryer/mixer that is sold by Astec, Inc. of Chattanooga, Tenn. Dryer/mixer 12 includes a generally cylindrical fixed outer drum 18 mounted on an inclined frame, and a heating chamber comprised of generally cylindrical inner drum 22 that is adapted to rotate with respect to the outer drum. More particularly, preferred inner drum 22 is in the form of a right circular cylinder that is adapted to rotate about an axis of rotation that coincides with the axis of the cylinder. Inner drum 22 is rotatably mounted on the frame by a plurality of bearings (not shown) and is driven to rotate by a suitable drive system (also not shown). Preferably, this drive system comprises a variable frequency drive that is adapted to vary the rotational speed of inner drum 22 with respect to outer drum 18. A burner 24 at lower end 26 of the dryer/mixer (on the left side as viewed in FIG. 1) directs a flame 28 in a generally axial direction into the interior of inner drum 22. In a preferred embodiment of the invention, burner 24 is equipped with a variable frequency drive (not shown) that is adapted to vary either or both of the amount of excess air in burner 24 and the firing rate of burner 24. Such variable frequency drives are described in U.S. Pat. No. 8,863,404 (incorporated herein by reference).

Conveyor 30 at upper end 32 of dryer/mixer 12 (on the right side as viewed in FIG. 1) is adapted to deliver virgin aggregate material from various supply bins (not shown) into inner drum 22 through an inlet at the upper end comprising chute 44. Each of the supply bins is preferably equipped with a variable speed feeder that can control the discharge of material from the bin onto conveyor 30.

The interior of the inner drum 22 is functionally separated into a combustion zone located in the vicinity of burner flame 28 and a drying zone located between the combustion zone and the upper end 32 of dryer/mixer 12. Because upper end 32 of dryer mixer 12 is elevated above lower end 26, the aggregate material delivered into the interior of the inner drum through chute 44 will move towards the lower end as the inner drum rotates. Preferably, inner drum 22 includes a plurality of V-flights such as are described and shown in U.S. Pat. No. 8,863,404 on its inner surface.

Conveyor 46 at lower end 26 of the dryer/mixer (on the left side as viewed in FIG. 1) is adapted to deliver RAP and/or RAS through chute 48 into mixing chamber 50 between outer drum 18 and inner drum 22. Because of the proximity of mixing chamber 50 to the combustion zone in the inner drum, some heat will be transferred by conduction to the RAP and/or RAS in the mixing chamber. At the lower end of inner drum 22 are located a plurality of outlets, including opening 51, through which heated and dried virgin aggregate may pass from inner drum 22 into mixing chamber 50 between inner drum 22 and outer drum 18. Inner drum 22 also supports a plurality of mixing paddles 52 extending into mixing chamber 50. Aggregate material delivered through chute 44 is heated and dried and passed out of inner drum 22 into the mixing chamber, where it is thoroughly mixed with RAP and/or RAS material delivered through chute 48. The resulting mixture is then conveyed into an external mixer such as pugmill 53, where the mixture of RAP and/or RAS and virgin aggregate materials is further mixed with asphalt cement that is delivered to the pugmill through supply line 54 from an asphalt cement storage tank (not shown). Mixing paddles 56 thoroughly mix the asphalt cement with the aggregate materials in pugmill 53, and they also convey the mixture towards product outlet 58.

Combustion products and exhaust gases generated during the operation of dryer/mixer 12 rise out of the inner drum 22 through exhaust gas outlet conduit 60 towards dust collection assembly 14. Dust collection assembly 14 may comprise an inertially driven primary collector such as a cyclone and a filter-based secondary collector such as a baghouse, or it may comprise a filter-based collector alone. The invention comprises an exhaust quenching system which employs evaporative cooling to cool the exhaust gases in exhaust gas outlet conduit 60 upstream of the dust collection assembly. In one embodiment of the invention, controller 16 is operatively connected to pump 19, and may be operated to cause the pump to deliver water from reservoir 18 through water line 62 to atomization nozzle 64 located within the exhaust gas outlet conduit. Preferably, pump 19 is driven by a variable frequency drive that may be operated by the controller to deliver water to outlet conduit 60 at rates and/or pressures that are selected to effect evaporative cooling of the exhaust gases in exhaust gas outlet conduit 60. It is also preferred that pump 19 be capable of providing water to nozzle 64 in a quantity of 6-7 gallons per minute or more at a pressure of 1000 psia or more.

Water added to the hot gas stream in outlet conduit 60 according to a preferred embodiment of the invention will vaporize, thereby reducing the temperature of the gas stream by 50°-75° F. or more. Preferably, the water will be delivered under conditions that permit at least a portion of it, and most preferably substantially all of it, to flash to steam very quickly. This may be accomplished by controlling the flow rates and pressures at which the water is delivered and/or through atomization of the water entering the exhaust gas outlet conduit by means of atomization nozzle 64. In other embodiments of the invention, controller 16 is operatively connected to heat exchanger 20 and adapted to cause the heat exchanger to add heat to the water in line 62. Controller 16 may also be operated to add sufficient heat to the water in line 62, by means of heat exchanger 20, to superheat the water beyond its boiling point at ordinary pressures. If the water entering exhaust gas outlet conduit 60 does not flash to steam quickly, it is possible that the dust in the gas stream may combine with the liquid water to form mud in exhaust gas outlet conduit 60 or downstream in the separation and filtering devices of dust collection assembly 14, including primary components such as cyclones and/or in the filter cartridges or filter bags of a secondary baghouse.

In preferred embodiments, therefore, the invention contemplates the introduction into the exhaust gas outlet conduit of very-high pressure water with an atomizing nozzle, and/or the addition of heat to the water, including but not limited to superheating the water, prior to its introduction into the exhaust gas outlet conduit. It is desired that the water quickly flash to steam in the exhaust gas outlet conduit upon exiting the atomizing nozzle.

In addition, controller 16 may be operatively connected to the variable frequency drive systems on inner drum 22 and burner 24. In these embodiments of the invention, controller 16 is adapted to control the temperature of the exhaust gases from dryer/mixer 12 that pass through exhaust gas outlet conduit 60 by regulating the variable frequency drive system on inner drum 22 and/or by regulating the variable frequency drive systems on burner 24. Furthermore, it is known that dryer/mixer 12 may be operated so that the exhaust gas temperature changes approximately inversely to the rotational speed of the inner drum. In asphalt production facility 10, therefore, controller 16 may also be adapted to control the variable frequency drive of inner drum 22 of dryer/mixer 12 in order to control the rotational speed of the inner drum. The temperature of the exhaust gases passing through exhaust gas outlet conduit 60 can be varied by approximately 100° F. by increasing and decreasing the rotational speed of inner drum 22 of dryer/mixer 12.

In embodiments of the invention in which the controller is operatively connected to the variable frequency drives of burner 24, the controller may be adapted to operate the variable frequency drive of burner 24 in order to control the amount of excess air in the burner. More particularly, in the event that the exhaust gas temperature cannot be sufficiently increased or decreased by altering the rotational speed of inner drum 22, the controller may vary the amount of excess air in burner 24. In asphalt concrete production facility 10, an increase in the amount of excess air in burner 24 will increase the temperature of exhaust gases passing through exhaust gas outlet conduit 60, and a decrease in the amount of excess air in the burner will decrease the temperature of these exhaust gases. Preferably, the amount of excess air in burner 24 may be varied from an excess air baseline by approximately ±10%. Controller 16 may also be operated to vary the firing rate of burner 24, as a consequence of the changed heat demand caused by the variation of the amount of burner excess air and/or the variation of the rotational speed of inner drum 22, or otherwise in order to effect evaporative cooling of the exhaust gases in exhaust gas outlet conduit 60 upstream of dust collection assembly 14.

Although this description contains many specifics, these should not be construed as limiting the scope of the invention, but as merely providing illustrations of the presently preferred embodiment thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. An improved asphalt concrete production plant having a dryer for drying aggregate material, an exhaust gas outlet conduit for discharge of exhaust gases from the dryer, and a dust collection assembly that is adapted to receive exhaust gases and entrained dust from the dryer via the exhaust gas outlet conduit, wherein the improvement comprises an exhaust quenching system that is operatively connected to the exhaust gas outlet conduit, said exhaust quenching system comprising means for effecting evaporative cooling of the exhaust gases in the exhaust gas outlet conduit upstream of the dust collection assembly.

2. The asphalt concrete production plant of claim 1 wherein the means for effecting evaporative cooling of the exhaust gases in the exhaust gas outlet conduit comprises:
   (a) a water reservoir;
   (b) a water line that extends from the water reservoir into the exhaust gas outlet conduit;
   (c) a pump for pumping water from the water reservoir through the water line into the exhaust gas outlet conduit;
   (d) a controller that is adapted to effect evaporative cooling of the exhaust gases in the exhaust gas outlet conduit upstream of the dust collection assembly by causing at least a portion of the water that is pumped into the exhaust gas outlet conduit to flash to steam upon entering the exhaust gas outlet conduit.

3. The asphalt concrete production plant of claim 2 wherein the controller is adapted to effect evaporative cooling of the exhaust gases in the exhaust gas outlet conduit upstream of the dust collection assembly by causing substantially all of the water that is pumped into the exhaust gas outlet conduit to flash to steam upon entering the exhaust gas outlet conduit.

4. The asphalt concrete production plant of claim 2 which includes an atomization nozzle on the water line within the exhaust gas outlet conduit.

5. The asphalt concrete production plant of claim 4 wherein the controller is:
   (a) operatively attached to the pump;
   (b) adapted to cause the pump to pump water through the atomization nozzle at a flow rate and pressure sufficient to cause at least a portion of the water that is pumped into the exhaust gas outlet conduit to flash to steam upon entering the exhaust gas outlet conduit.

6. The asphalt concrete production plant of claim 4 wherein the controller is:
   (a) operatively attached to the pump;
   (b) adapted to cause the pump to pump water from the water reservoir through the atomization nozzle at a flow rate of at least about 6 gallons per minute and at a pressure of at least about 1000 psia.

7. The asphalt concrete production plant of claim 2:
   (a) which includes a heat exchanger on the water line upstream of the exhaust gas outlet conduit;
   (b) wherein the controller is operatively attached to the heat exchanger;
   (c) wherein the controller is adapted to cause the heat exchanger to increase the temperature of the water that is pumped into the exhaust gas outlet conduit to a temperature that is sufficient to cause at least a portion of the water to flash to steam upon entering the exhaust gas outlet conduit.

8. The asphalt concrete production plant of claim 7, wherein the controller is adapted to cause the heat exchanger to add sufficient heat to the water that is pumped into the exhaust gas outlet conduit to superheat the water beyond its boiling point.

9. The asphalt concrete production plant of claim 2:
   (a) wherein the dryer comprises:
       (i) a drum that is in the form of an inclined right circular cylinder having an upper end and a lower end, which drum is adapted to rotate about an axis of rotation that coincides with the axis of the cylinder;
(ii) a burner at the lower end of the drum that is adapted to direct a flame into the drum;
(iii) an inlet at the upper end of the drum for introduction of aggregate material to be dried;
(iv) an outlet at the lower end of the drum for discharge of aggregate material that has been dried;
(v) a variable frequency drive system for the drum that is adapted to vary the rotational speed of the drum;
(b) wherein the controller is:
(i) operatively connected to the variable frequency drive system for the drum;
(ii) adapted to vary the temperature of the exhaust gases entering the exhaust gas outlet conduit by varying the rotational speed of the drum.

10. The asphalt concrete production plant of claim 2:
(a) wherein the dryer comprises:
(i) a drum that is in the form of an inclined right circular cylinder having an upper end and a lower end, which drum is adapted to rotate about an axis of rotation that coincides with the axis of the cylinder;
(ii) a burner at the lower end of the drum that is adapted to direct a flame into the drum;
(iii) an inlet at the upper end of the drum for introduction of aggregate material to be dried;
(iv) an outlet at the lower end of the drum for discharge of aggregate material that has been dried;
(v) a variable frequency drive system for the burner that is adapted to vary the amount of excess air in the burner;
(b) wherein the controller is:
(i) operatively connected to the variable frequency drive system for the burner;
(ii) adapted to vary the temperature of the exhaust gases entering the exhaust gas outlet conduit by varying the amount of excess air in the burner.

11. The asphalt concrete production plant of claim 2:
(a) wherein the dryer comprises:
(i) a drum that is in the form of an inclined right circular cylinder having an upper end and a lower end, which drum is adapted to rotate about an axis of rotation that coincides with the axis of the cylinder;
(ii) a burner at the lower end of the drum that is adapted to direct a flame into the drum;
(iii) an inlet at the upper end of the drum for introduction of aggregate material to be dried;
(iv) an outlet at the lower end of the drum for discharge of aggregate material that has been dried;
(v) a variable frequency drive system for the burner that is adapted to vary the firing rate of the burner;
(b) wherein the controller is:
(i) operatively connected to the variable frequency drive system for the burner;
(ii) adapted to vary the temperature of the exhaust gases entering the exhaust gas outlet conduit by varying the firing rate of the burner.

12. An improved combination of components for use in the production of asphalt concrete, said combination including a dryer for drying aggregate material, an exhaust gas outlet conduit for discharge of exhaust gases from the dryer, and a dust collection assembly that is adapted to receive exhaust gases and entrained dust from the dryer via the exhaust gas outlet conduit, wherein the improvement comprises an exhaust quenching system that is operatively connected to the exhaust gas outlet conduit, said exhaust quenching system including:
(a) a water reservoir;
(b) a water line that extends from the water reservoir into the exhaust gas outlet conduit;
(c) an atomization nozzle on the water line within the exhaust gas outlet conduit;
(d) a pump for pumping water from the water reservoir through the water line and out of the atomization nozzle within the exhaust gas outlet conduit;
(e) a controller that is adapted to effect evaporative cooling of the exhaust gases in the exhaust gas outlet conduit upstream of the dust collection assembly by causing substantially all of the water that is pumped into the exhaust gas outlet conduit to flash to steam upon entering the exhaust gas outlet conduit.

13. A method for operating a combination of components for use in the production of asphalt concrete, said combination including a dryer for drying aggregate material, an exhaust gas outlet conduit for discharge of exhaust gases from the dryer, and a dust collection assembly that is adapted to receive exhaust gases and entrained dust from the dryer via the exhaust gas outlet conduit, wherein the method comprises:
(a) providing an exhaust quenching system that is operatively connected to the exhaust gas outlet conduit, said exhaust quenching system including:
(i) a water reservoir;
(ii) a water line that extends from the water reservoir into the exhaust gas outlet conduit;
(iii) an atomization nozzle on the water line within the exhaust gas outlet conduit;
(iv) a pump for pumping water from the water reservoir through the water line and out of the atomization nozzle within the exhaust gas outlet conduit;
(v) a controller that is adapted to effect evaporative cooling of the exhaust gases in the exhaust gas outlet conduit upstream of the dust collection assembly by causing at least a portion of the water that is pumped into the exhaust gas outlet conduit to flash to steam upon entering the exhaust gas outlet conduit;
(b) introducing aggregate material into the dryer;
(c) operating the dryer to dry the aggregate material, thereby producing exhaust gases with dust entrained therein;
(d) discharging the exhaust gases with dust entrained therein through the exhaust gas outlet conduit;
(e) operating the controller to effect evaporative cooling of the exhaust gases in the exhaust gas outlet conduit upstream of the dust collection assembly by causing at least a portion of the water that is pumped into the exhaust gas outlet conduit to flash to steam upon entering the exhaust gas outlet conduit.

14. The method of claim 13 which includes:
(a) providing an exhaust quenching system including a controller that is adapted to effect evaporative cooling of the exhaust gases in the exhaust gas outlet conduit upstream of the dust collection assembly by causing substantially all of the water that is pumped into the exhaust gas outlet conduit to flash to steam upon entering the exhaust gas outlet conduit;
(b) operating the controller to effect evaporative cooling of the exhaust gases in the exhaust gas outlet conduit upstream of the dust collection assembly by causing substantially all of the water that is pumped into the exhaust gas outlet conduit to flash to steam upon entering the exhaust gas outlet conduit.

15. The method of claim 13 which includes:
(a) operatively connecting the controller to the pump;

(b) operating the controller to cause the pump to pump water through the atomization nozzle at a flow rate and pressure sufficient to cause at least a portion of the water that is pumped into the exhaust gas outlet conduit to flash to steam upon entering the exhaust gas outlet conduit.

16. The method of claim 13 which includes:
(a) providing a heat exchanger on the water line upstream of the exhaust gas outlet conduit;
(b) operatively connecting the controller to the heat exchanger;
(c) operating the controller to cause the heat exchanger to increase the temperature of the water that is pumped into the exhaust gas outlet conduit to a temperature that is sufficient to cause at least a portion of the water to flash to steam upon entering the exhaust gas outlet conduit.

17. The method of claim 13 which includes:
(a) providing a dryer comprising:
    (i) a drum that is in the form of an inclined right circular cylinder having an upper end and a lower end, which drum is adapted to rotate about an axis of rotation that coincides with the axis of the cylinder;
    (ii) a burner at the lower end of the drum that is adapted to direct a flame into the drum;
    (iii) an inlet at the upper end of the drum for introduction of aggregate material to be dried;
    (iv) an outlet at the lower end of the drum for discharge of aggregate material that has been dried;
    (v) a variable frequency drive system for the drum that is adapted to vary the rotational speed of the drum;
(b) operatively connecting the controller to the variable frequency drive system for the drum in such a manner that the controller is adapted to vary the temperature of the exhaust gases entering the exhaust gas outlet conduit by varying the rotational speed of the drum;
(c) operating the controller to vary the temperature of the exhaust gases entering the exhaust gas outlet conduit by varying the rotational speed of the drum so as to cause at least a portion of the water to flash to steam upon entering the exhaust gas outlet conduit.

18. The method of claim 13 which includes:
(a) providing the dryer in the form of:
    (i) a drum that is in the form of an inclined right circular cylinder having an upper end and a lower end, which drum is adapted to rotate about an axis of rotation that coincides with the axis of the cylinder;
    (ii) a burner at the lower end of the drum that is adapted to direct a flame into the drum;
    (iii) an inlet at the upper end of the drum for introduction of aggregate material to be dried;
    (iv) an outlet at the lower end of the drum for discharge of aggregate material that has been dried;
    (v) a variable frequency drive system for the burner that is adapted to vary the amount of excess air in the burner;
(b) operatively connecting the controller to the variable frequency drive system for the burner in such a manner that the controller is adapted to vary the temperature of the exhaust gases entering the exhaust gas outlet conduit by varying the amount of excess air in the burner;
(c) operating the controller to vary the temperature of the exhaust gases entering the exhaust gas outlet conduit by varying the amount of excess air in the burner so as to cause at least a portion of the water to flash to steam upon entering the exhaust gas outlet conduit.

19. The method of claim 13 which includes:
(a) providing the dryer in the form of:
    (i) a drum that is in the form of an inclined right circular cylinder having an upper end and a lower end, which drum is adapted to rotate about an axis of rotation that coincides with the axis of the cylinder;
    (ii) a burner at the lower end of the drum that is adapted to direct a flame into the drum;
    (iii) an inlet at the upper end of the drum for introduction of aggregate material to be dried;
    (iv) an outlet at the lower end of the drum for discharge of aggregate material that has been dried;
    (v) a variable frequency drive system for the burner that is adapted to vary the firing rate of the burner;
(b) operatively connecting the controller to the variable frequency drive system for the burner in such a manner that the controller is adapted to vary the temperature of the exhaust gases entering the exhaust gas outlet conduit by varying the firing rate of the burner;
(c) operating the controller to vary the temperature of the exhaust gases entering the exhaust gas outlet conduit by varying the firing rate of the burner so as to cause at least a portion of the water to flash to steam upon entering the exhaust gas outlet conduit.

* * * * *